United States Patent [19]
Wates

[11] Patent Number: 5,937,970
[45] Date of Patent: Aug. 17, 1999

[54] COMPRESSED AIR LUBRICATORS

[75] Inventor: Michael J Wates, Moreton-in-Marsh, United Kingdom

[73] Assignee: IMI Norgren Limited, Lichfield, United Kingdom

[21] Appl. No.: 08/923,539

[22] Filed: Sep. 4, 1997

[30]     Foreign Application Priority Data

Sep. 4, 1996 [GB] United Kingdom .................. 9618414

[51] Int. Cl.⁶ ............................... F16N 7/30; G01F 1/22
[52] U.S. Cl. ........................................ 184/55.2; 73/861.53
[58] Field of Search ........................... 73/861.42, 861.46, 73/861.47, 861.49, 861.53, 861.58, 861.61, 861.63, 861.82; 184/55.2, 57, 58, 59; 251/123, 124, 43; 137/843, 852, 854

[56]                 References Cited

U.S. PATENT DOCUMENTS

| | | | |
|---|---|---|---|
| 3,572,469 | 3/1971 | Miller et al. | 184/55.2 |
| 3,680,661 | 8/1972 | Dolegowski | 184/55.2 |
| 3,696,889 | 10/1972 | Brake | 184/55.2 |
| 3,703,940 | 11/1972 | Morita | 184/55.2 |
| 3,989,037 | 11/1976 | Franetzki | 73/861.53 |
| 4,234,014 | 11/1980 | Knight | 184/55.2 |
| 4,807,721 | 2/1989 | Fujiwara | 184/55.2 |
| 4,993,269 | 2/1991 | Guillaume et al. | 73/861.53 |
| 5,033,312 | 7/1991 | Stupecky | 73/861.53 |
| 5,038,621 | 8/1991 | Stupecky | 73/861.53 |
| 5,254,264 | 10/1993 | Armstrong | 184/55.2 |
| 5,427,203 | 6/1995 | Anspach, Jr. et al. | 184/55.2 |
| 5,653,310 | 8/1997 | Young | 184/55.2 |
| 5,725,073 | 3/1998 | Zhou | 184/55.2 |

*Primary Examiner*—Harshad Patel
*Assistant Examiner*—Robin Clark
*Attorney, Agent, or Firm*—Pillsbury Madison & Sutro, LLP

[57]                  ABSTRACT

A flow sensor of the disc type for a compressed air lubricator comprises a flexible elastomeric disc having a pair of radial channels formed in each of its major surfaces. The channels afford lines of weakness which enable the disc readily and progressively to deform into a fluted cone-like configuration as the air flow rate through the lubricator increases, thereby increasing the potential air flow capacity of the lubricator compared to those including known designs of disc type flow sensor.

5 Claims, 2 Drawing Sheets

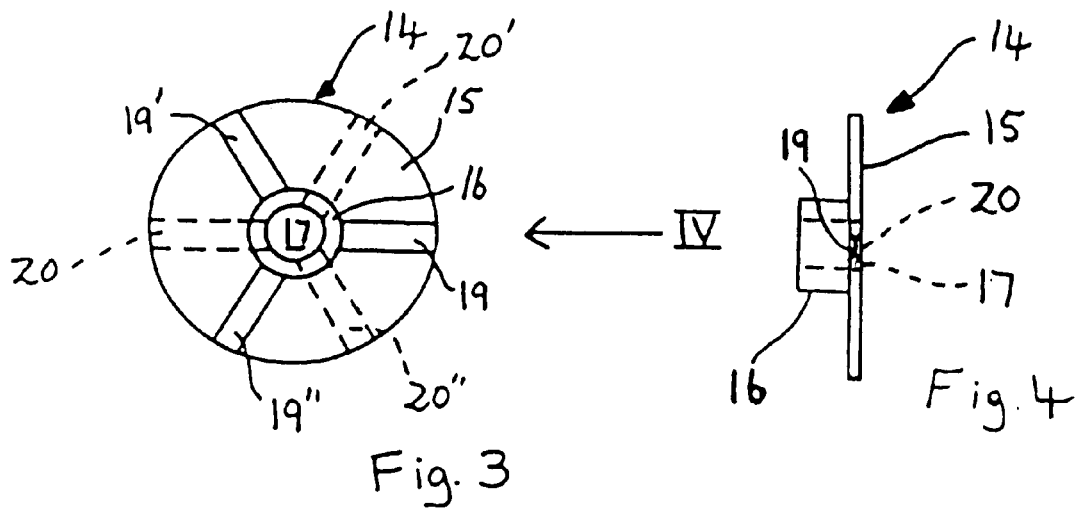
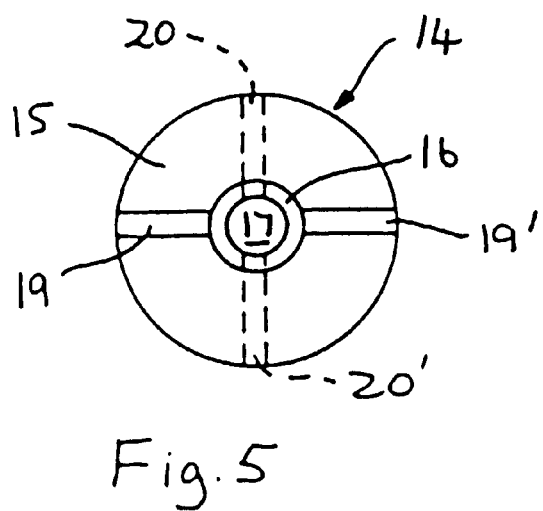
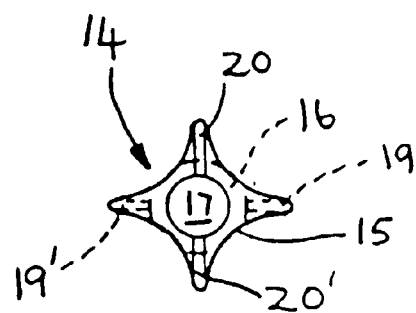

COMPRESSED AIR LUBRICATORS

FIELD OF THE INVENTION

This invention relates to compressed air lubricators and more particularly to the so-called "flow sensor" which is conventionally incorporated into them.

BACKGROUND OF THE INVENTION

It is well-known that many pneumatic devices, such as certain pneumatic tools, cylinders and control valves require the compressed air to contain a lubricant in the form of an oil fog. For that purpose, compressed air lines frequently include a lubricator unit that introduces a fog of oil into the compressed air as it flows through it. The lubricator includes an adjustable oil metering device so that the user can adjust the amount of oil introduced into the compressed air depending on the lubrication requirements of the pneumatic devices in question. The oil is automatically introduced into the compressed air, via the metering device, by virtue of a small pressure drop, typically of the order of 100 mbar, established in the lubricator by the flow sensor which is located in the lubricator's flow passage and which acts as a venturi type of device.

One requisite characteristic of the flow sensor is that, as the compressed air flow rate through the lubricator increases consequent on an increased demand for compressed air, the pressure drop increases approximately proportionally whereby the amount of oil introduced into the compressed air increases, also approximately proportionally. In other words, at a given setting of the metering device, the flow sensor ensures that the oil-to-air concentration remains substantially constant over a wide range of air flow rates through the lubricator. To that end, the flow sensor conventionally comprises a disc-like structure fixedly secured in the lubricator's flow passage, the air passing through an annular gap defined between the periphery of the disc and the internal surface of the flow passage. As the compressed air flow rate through the lubricator increases, the disc progressively deforms in a downstream direction whereby the cross-sectional area of the annular gap increases. In one typical design, the flow sensor comprises a flexible, plain-surfaced elastomeric disc secured in place at its centre which tends towards a conical configuration as the air flow rate through the lubricator increases. Accordingly, the circumference of the disc attempts to reduce, ie the rubber attempts to become circumferentially compressed, but the inherent nature of the material resists this. In practice, therefore, we have found that the periphery of the disc actually hinges so as to form four small 'flaps'. In any event, because of the disc's inherent resistance to being deformed, the aforementioned design places a restriction on the maximum compressed air flow rate through the lubricator.

In an alternative, known design, the flow sensor comprises a diametric support rib to which a pair of semi-circular flaps are hinged by thin membranes. Again, this design of flow sensor is usually made of an elastomer as an integral moulding. Whilst, in that design, deformation of the sensor occurs more readily (by virtue of a hinging action of the flaps), the support rib occupies a relatively large proportion of the cross-sectional area of the lubricator's flow passage thereby limiting the flow capacity therethrough.

It is an object of the present invention to provide an improved flow sensor for a compressed air lubricator which, other things being equal, will permit of higher air flow rates.

SUMMARY OF THE INVENTION

According to one aspect of the present invention, therefore, there is provided a flow sensor for a compressed air lubricator, the sensor comprising a resiliently flexible disc having mounting means for fixedly mounting it in the flow passageway of the lubricator, characterised in that one or both major surfaces of the disc have formed therein a plurality of substantially radially extending, elongate channels thereby affording radial lines of weakness.

We have discovered that the radial lines of weakness enable the disc readily and progressively to deform, with increasing compressed air flow rate, from a substantially planar configuration to a fluted cone-like configuration whereby the lubricator may cope with relatively higher air flow capacities.

In one preferred embodiment, the flow sensor comprises a thin disc of substantially uniform thickness, each surface of the disc having two radial channels formed in it arranged on one and the same diameter, the channels in one surface being offset by 90° to those in the other surface.

In another preferred embodiment, the flow sensor comprises a thin disc of substantially uniform thickness having three radially extending channels formed symmetrically in each of its surfaces (ie extending at about 120° to one another) with those in one surface being offset by about 60° to those in the other, reverse surface.

Each channel is, in cross-section, preferably arcuate.

The mounting means may correspond to one or other of those used for known flow sensors. For example, it may comprise a hole formed centrally in the disc surrounded by a short hollow cylindrical boss that projects from one surface of the disc and that is formed integrally therewith.

The disc and the mounting means are preferably moulded in one piece from an elastomer, for example a polyurethane or nitrile rubber.

According to a further aspect of the present invention, there is provided a compressed air lubricator including a flow sensor as defined above.

BRIEF DESCRIPTION OF THE DRAWINGS

The invention will now be described in more detail, by way of example only, with reference to the accompanying drawings in which:

FIG. 3 is an end view of one form of flow sensor in the direction of arrow III in FIG. 2;

FIG. 4 is a side view of the flow sensor shown in FIG. 3 in the direction of arrow IV in FIG. 3;

FIG. 5 is a view similar to that of FIG. 3 showing an alternative form of flow sensor; and FIG. 6 is an end view, downstream of the air flow, of the flow sensor shown in FIG. 5 when in a more or less fully deformed state, ie. when the flow rate through the lubricator is more or less at its maximum.

DESCRIPTION OF THE PREFERRED EMBODIMENTS

Figure 1:
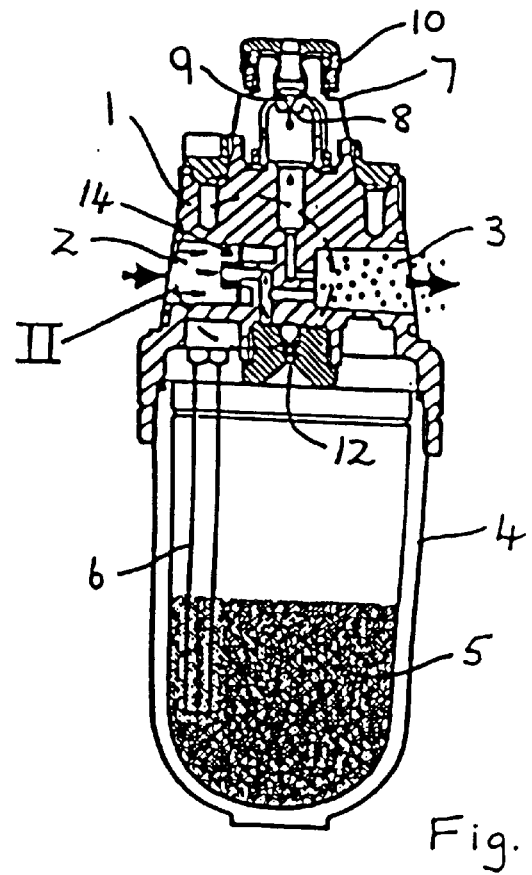
FIG. 1 is a sectional side elevation, on a reduced scale, of a compressed air lubricator including a flow sensor of the invention.
Figure 2:
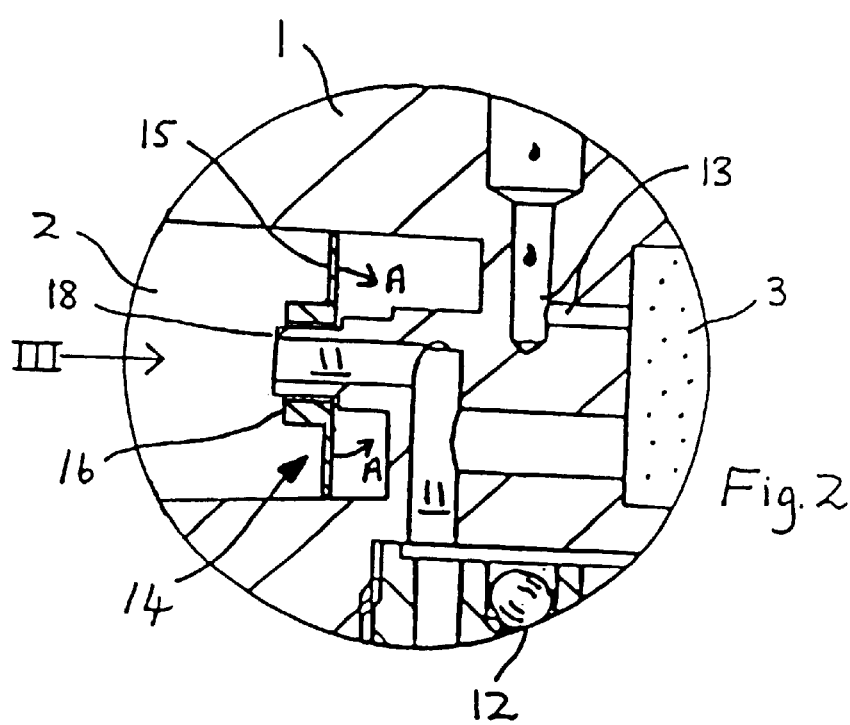
FIG. 2 is a detail of the circled part II of FIG. 1.

Referring first to FIGS. 1 and 2, save for the particular design of the flow sensor, all of the components are conventional and will be familiar to those skilled in the art. Briefly, however, the lubricator comprises a body 1 having an inlet passageway 2 in communication with an outlet passageway 3 connected into a compressed air line (not shown).

The body 1 supports a depending bowl 4 that contains a quantity of lubricating oil 5 into which extends an open-ended, vertical tube 6 supported by the body 1. The upper end of the tube 6 communicates, via a passageway (not shown) formed in the body 1, with a so-called sight feed dome 7. The sight feed dome 7 comprises a metering orifice 8, the size of which is variable by means of a tapered needle 9 that is screw-threadedly engaged in the dome 7. The needle is secured at its upper end to a manually rotatable adjusting knob 10 which, upon anti-clockwise rotation, increases the cross-sectional area of the metering orifice 8 and, conversely, upon clockwise rotation decreases it eventually closing the orifice 8 completely.

By way of a passageway 11 (see FIG. 2) formed within the body 1, the compressed air inlet passageway 2 communicates with the interior of the bowl 4 via a charge valve 12, whereby, in use, some of the compressed air enters the bowl 4 and pressurises it.

The compressed air outlet passageway 3 communicates with the outlet side of the sight feed dome 7 below the metering orifice 8 via an oil feed passageway 14.

Located in the inlet passageway 2 is a resiliently flexible flow sensor 14 that serves, in use, to create a small pressure drop in the outlet passageway 3 that is proportional to the compressed air flow rate through the lubricator. Accordingly, when air is flowing through the lubricator, the air pressure in the outlet passageway 3 will be slightly less than the air pressure in the bowl 4 and lubricating oil 5 in the bowl 4 therefore passes upwards through the tube 6 into the sight feed dome 7. The oil in the sight feed dome 7 drips into the oil feed passageway 13 via the metering orifice 8 and then into the outlet passageway 3 where the oil drops are atomised by the air flow to form an "oil fog".

At a given air flow rate, the amount of oil delivered into the air stream is governed by the setting of the metering orifice 8 and may be decreased or increased as desired by adjustment of the needle 9 using the knob 10, as described earlier. The flow sensor 14 is designed such that, at a given setting of the needle 9, a nearly constant oil-to-air concentration obtains over a wide range of air flows.

More particularly, and with additional references to FIGS. 3 and 4, the flow sensor 14 comprises a thin elastomeric disc 15 having integrally formed with it an annular mounting boss 16 which surrounds a circular hole 17 formed centrally in the disc 15. The flow sensor 14 is fixedly mounted by the boss 16 on a tubular member 18 that defines the inlet end of the passageway 11, as can be clearly seen in FIG. 2 which shows the flow sensor 14 in its unflexed condition, ie with little or no air flow through the lubricator.

With specific reference now to FIGS. 3 and 4, it can be seen that the front face (ie. that facing upstream) of the disc 15 is formed with three symmetrically arranged channels 19, 19', 19" which extend from the periphery of the disc right up to the periphery of the boss 16. The rear face (ie. that facing downstream) of the disc 15 is likewise formed with three symmetrically arranged channels 20, 20', 20" offset, however, by 60° to the channels 19, 19', 19", which extend from the periphery of the disc right up to the periphery of the circular hole 17 formed in it.

Each channel 19, 19', 19" and 20, 20', 20" is shown to be arcuate in cross-section. However, channels of alternative cross-sections are possible, for example of rectangular cross-section, provided that they afford sufficient lines of weakness for the purpose described below.

Equally, there may be fewer or more channels, preferably symmetrically arranged. For example, each surface may have two radial channels formed in it arranged on one and the same diameter, the channels in one surface being offset by 90° to those in the other surface. FIG. 5 shows such an arrangement, the channels being designated 19, 19', 20 and 20' respectively.

The various dimensions of the flow sensor and its material of construction will depend on, inter alia, the characteristics required of it. Thus, for example, in the case of a ⅜" or ½" port size lubricator we have found it beneficial to mould the sensor shown in the drawings in an 80 I.H.R.D. polyurethane elastomer with the following approximate dimensions:

Diameter of disc: 17.8 mm
Thickness of disc: 0.8 to 1.00 mm
External diameter of boss: 6.4 mm
Internal diameter of boss: 4.3 mm
Width of each channel 19 etc measured: 2.5 mm at the surface of the disc 15
Depth of each channel 19 etc from: 0.4 to 0.5 mm its base to the surface of the disc
Radius of each channel 19 etc: 2.0 mm It will be appreciated, however, that the above dimensions may be varied somewhat.

In use, as the air flow rate through the lubricator increases, the disc portion 15 of the flow sensor progressively and resiliently folds, generally in the direction of the arrows A in FIG. 2, about the lines of weakness afforded by the channels 19 etc into a fluted cone-like configuration. A downstream end view of the sensor shown in FIG. 5 in such configuration is shown in FIG. 6. Thus, the cross-sectional area of the annular gap in the inlet passageway 2 may progressively increase to such an extent that, compared to an otherwise identical lubricator with a conventional design of flow sensor, a significantly greater, typically about 30% greater, air flow capacity is possible.

A flow sensor of the invention is suitable for use in any type of compressed air lubricator that utilises a flexible disc sensor. Thus, whilst the lubricator depicted in FIG. 1 shows a typical, so-called "oil-fog" lubricator, the sensor may equally be used in lubricators designed to produce extremely small oil droplets in the nature of an aerosol such as, for example, our MICROFOG (Trade Mark) lubricators.

What I claim is:

1. A flow sensor for a compressed air lubricator, the sensor comprising a resiliently flexible disc having mounting means for fixedly mounting it in the flow passageway of the lubricator, the improvement wherein one or both major surfaces of the disc have formed therein a plurality of substantially radially extending, elongate channels thereby affording radial lines of weakness.

2. A flow sensor according to claim 1 wherein each major surface of the disc has two said channels formed therein lying substantially on one and the same diameter, the channels in one major surface being offset by about 90° to those in the other major surface.

3. A flow sensor according to claim 1 wherein each major surface of the disc has three said channels formed therein extending at about 120° to one another, the channels in one major surface being offset by about 60° to those in the other major surface.

4. A flow sensor according to claim 1 wherein each said channel is arcuate in cross-section.

5. A compressed air lubricator including a flow sensor as claimed in claim 1.

* * * * *